US011562044B1

United States Patent
Du et al.

(10) Patent No.: US 11,562,044 B1
(45) Date of Patent: Jan. 24, 2023

(54) SYSTEMS AND METHODS FOR INTEGRATON OF ELECTRONIC INFORMATION CARDS INTO A CLIENT APPLICATION

(71) Applicant: MicroStrategy Incorporated, Tysons Corner, VA (US)

(72) Inventors: Xiaochen Du, Fairfax, VA (US); Raul De Leon, Vienna, VA (US); Jose Manuel Nocedal De La Garza, Leesburg, VA (US); Liang Chen, Fairfax, VA (US); Jiao Xu, Fairfax, VA (US); Jiande Yu, McLean, VA (US)

(73) Assignee: MicroStrategy Incorporated, Tysons Corner, VA (US)

( * ) Notice: Subject to any disclaimer, the term of this patent is extended or adjusted under 35 U.S.C. 154(b) by 78 days.

(21) Appl. No.: 17/097,489

(22) Filed: Nov. 13, 2020

(51) Int. Cl.
*G06F 16/958* (2019.01)
*H04L 9/40* (2022.01)
*G06F 16/14* (2019.01)
*G06F 8/76* (2018.01)
*G06F 16/2455* (2019.01)
(Continued)

(52) U.S. Cl.
CPC .............. *G06F 16/986* (2019.01); *G06F 8/76* (2013.01); *G06F 9/547* (2013.01); *G06F 16/148* (2019.01); *G06F 16/24565* (2019.01); *G06F 16/9536* (2019.01); *G06F 16/9538* (2019.01); *G06F 40/143* (2020.01); *H04L 63/0815* (2013.01); *G06Q 10/101* (2013.01); *G06Q 10/109* (2013.01); *G06Q 30/0185* (2013.01)

(58) Field of Classification Search
CPC ................. G06F 16/986; G06F 16/148; G06F 16/24565; G06F 16/9536; G06F 16/9538; G06F 40/143; G06F 8/76; G06F 9/547; H04L 63/0815; G06Q 10/101; G06Q 10/109; G06Q 30/0185
USPC ......................................................... 707/722
See application file for complete search history.

(56) References Cited

U.S. PATENT DOCUMENTS 7,130,841 B1 * 10/2006 Goel .................... G06F 16/9014
709/219
8,041,711 B2 * 10/2011 Walker .................. G06F 16/134
707/726

(Continued)

*Primary Examiner* — Hosain T Alam
*Assistant Examiner* — Robert F May
(74) *Attorney, Agent, or Firm* — Bookoff McAndrews, PLLC

(57) ABSTRACT

Methods, systems, and apparatus, including computer programs stored on computer-readable media, for integrating electronic card display at a client via a software development kit (SDK) provided at one or more data servers are disclosed. A client-side application such as a web browser may request the SDK based on a code snippet included in a data file, such as a HyperText Markup Language (HTML) file for a web page. Once the SDK is received at the client, the client-side application may perform various functionalities enabled by the SDK, including determining terms in the data file that match keywords associated with electronic cards, requesting and receiving electronic card rendering data associated with the electronic cards, and modifying a display generated based on the data file to display an electronic card, upon detecting a trigger event in relation to a term within the web page that corresponds to the electronic card.

20 Claims, 7 Drawing Sheets

(51) Int. Cl.
    *G06F 16/9536*    (2019.01)
    *G06F 16/9538*    (2019.01)
    *G06F 40/143*     (2020.01)
    *G06F 9/54*       (2006.01)
    G06Q 30/00      (2012.01)
    G06Q 10/10      (2012.01)

(56) References Cited

U.S. PATENT DOCUMENTS

| | | | | |
|---|---|---|---|---|
| 8,745,718 | B1* | 6/2014 | Dufel | H04L 63/08 |
| | | | | 726/8 |
| 8,898,595 | B2* | 11/2014 | Cragun | G06F 16/34 |
| | | | | 715/822 |
| 10,169,427 | B2* | 1/2019 | Aaron | G06F 16/93 |
| 2009/0100323 | A1* | 4/2009 | Walls | G06F 16/9558 |
| | | | | 715/206 |
| 2016/0132970 | A1* | 5/2016 | Greenberg | G06F 3/0485 |
| | | | | 705/4 |
| 2016/0188719 | A1* | 6/2016 | Glover | G06Q 30/0261 |
| | | | | 707/706 |
| 2017/0046180 | A1* | 2/2017 | Desineni | G06F 9/542 |
| 2017/0185686 | A1* | 6/2017 | Levi | G06F 16/9566 |

\* cited by examiner

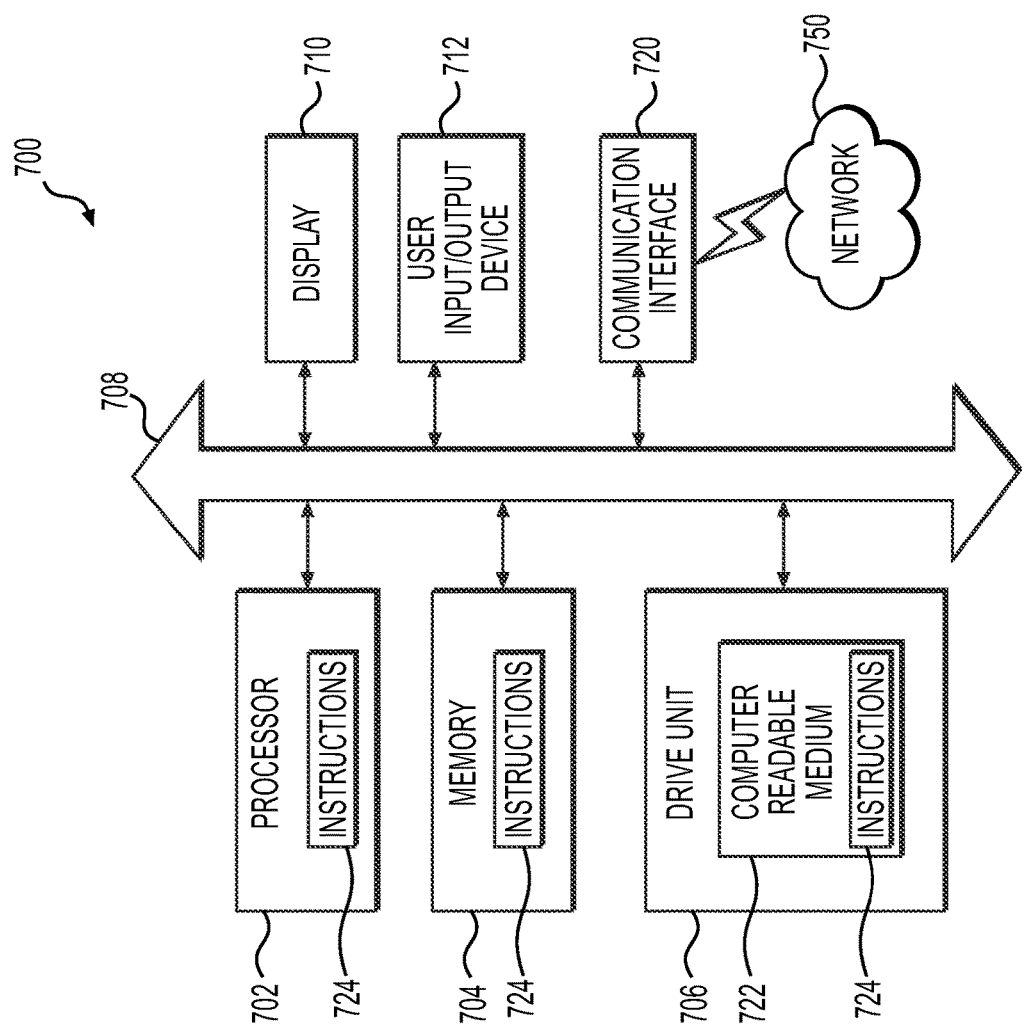

SYSTEMS AND METHODS FOR INTEGRATON OF ELECTRONIC INFORMATION CARDS INTO A CLIENT APPLICATION

TECHNICAL FIELD

The present disclosure relates generally to presenting electronic information to a user in a customized manner and, more particularly, to more easily integrating electronic information retrieval and presentation functionalities in a client environment.

BACKGROUND

Databases often include information about many topics. Users often retrieve content by issuing a query, for example, using natural language or using a structure query language (SQL). As data retrieval techniques rapidly advance, data customization and presentation have also become a vital part of data analytics.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one embodiment, a computer-implemented method of integrating electronic information card display at a client via a software development kit (SDK) provided at one or more data servers may comprise: requesting, by the client, the SDK from the one or more data servers based on a code snippet in a first data file; receiving, by the client, the SDK from the one or more data servers; requesting, by way of the SDK at the client, a plurality of keywords associated with a plurality of electronic information cards from the one or more data servers; receiving, by the client, the plurality of keywords from the one or more data servers; determining, by way of the SDK, one or more terms in the first data file that match one or more keywords of the plurality of keywords; determining, by way of the SDK, one or more electronic information cards of the plurality of electronic information cards that correspond to the one or more keywords; requesting, by way of the SDK, electronic information card rendering data associated with the one or more electronic information cards from the one or more data servers; receiving, by the client, the electronic information card rendering data associated with the one or more electronic information cards from the one or more data servers; determining, by way of the SDK, whether a trigger event associated with a term of the one or more terms has occurred; and upon detecting the trigger event, modifying, by way of the SDK, a display based on the first data file to display an electronic information card that corresponds to a keyword of the one or more keywords matching the term, based on at least a portion of the electronic information card rendering data.

In one embodiment, a system may comprise: one or more processors; and one or more computer-readable media comprising instructions that, when executed by the one or more processors, cause the one or more processors to perform operations for integrating electronic information card display at a client via a software development kit (SDK) provided at one or more data servers. The operations may comprise: requesting, by the client, the SDK from the one or more data servers based on a code snippet in a first data file; receiving, by the client, the SDK from the one or more data servers; requesting, by way of the SDK at the client, a plurality of keywords associated with a plurality of electronic information cards from the one or more data servers; receiving, by the client, the plurality of keywords from the one or more data servers; determining, by way of the SDK, one or more terms in the first data file that match one or more keywords of the plurality of keywords; determining, by way of the SDK, one or more electronic information cards of the plurality of electronic information cards that correspond to the one or more keywords; requesting, by way of the SDK, electronic information card rendering data associated with the one or more electronic information cards from the one or more data servers; receiving, by the client, the electronic information card rendering data associated with the one or more electronic information cards from the one or more data servers; determining, by way of the SDK, whether a trigger event associated with a term of the one or more terms has occurred; and upon detecting the trigger event, modifying, by way of the SDK, a display based on the first data file to display an electronic information card that corresponds to a keyword of the one or more keywords matching the term, based on at least a portion of the electronic information card rendering data.

In one embodiment, one or more non-transitory computer-readable media may store instructions that, when executed by one or more processors, cause the one or more processors to perform operations for integrating electronic information card display at a client via a software development kit (SDK) provided at one or more data servers. The operations may comprise: requesting, by the client, the SDK from the one or more data servers based on a code snippet in a first data file; receiving, by the client, the SDK from the one or more data servers; requesting, by way of the SDK at the client, a plurality of keywords associated with a plurality of electronic information cards from the one or more data servers; receiving, by the client, the plurality of keywords from the one or more data servers; determining, by way of the SDK, one or more terms in the first data file that match one or more keywords of the plurality of keywords; determining, by way of the SDK, one or more electronic information cards of the plurality of electronic information cards that correspond to the one or more keywords; requesting, by way of the SDK, electronic information card rendering data associated with the one or more electronic information cards from the one or more data servers; receiving, by the client, the electronic information card rendering data associated with the one or more electronic information cards from the one or more data servers; determining, by way of the SDK, whether a trigger event associated with a term of the one or more terms has occurred; and upon detecting the trigger event, modifying, by way of the SDK, a display based on the first data file to display an electronic information card that corresponds to a keyword of the one or more keywords matching the term, based on at least a portion of the electronic information card rendering data.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 7 illustrates an implementation of a computer system that may execute techniques presented herein.

DETAILED DESCRIPTION

Figure 1:
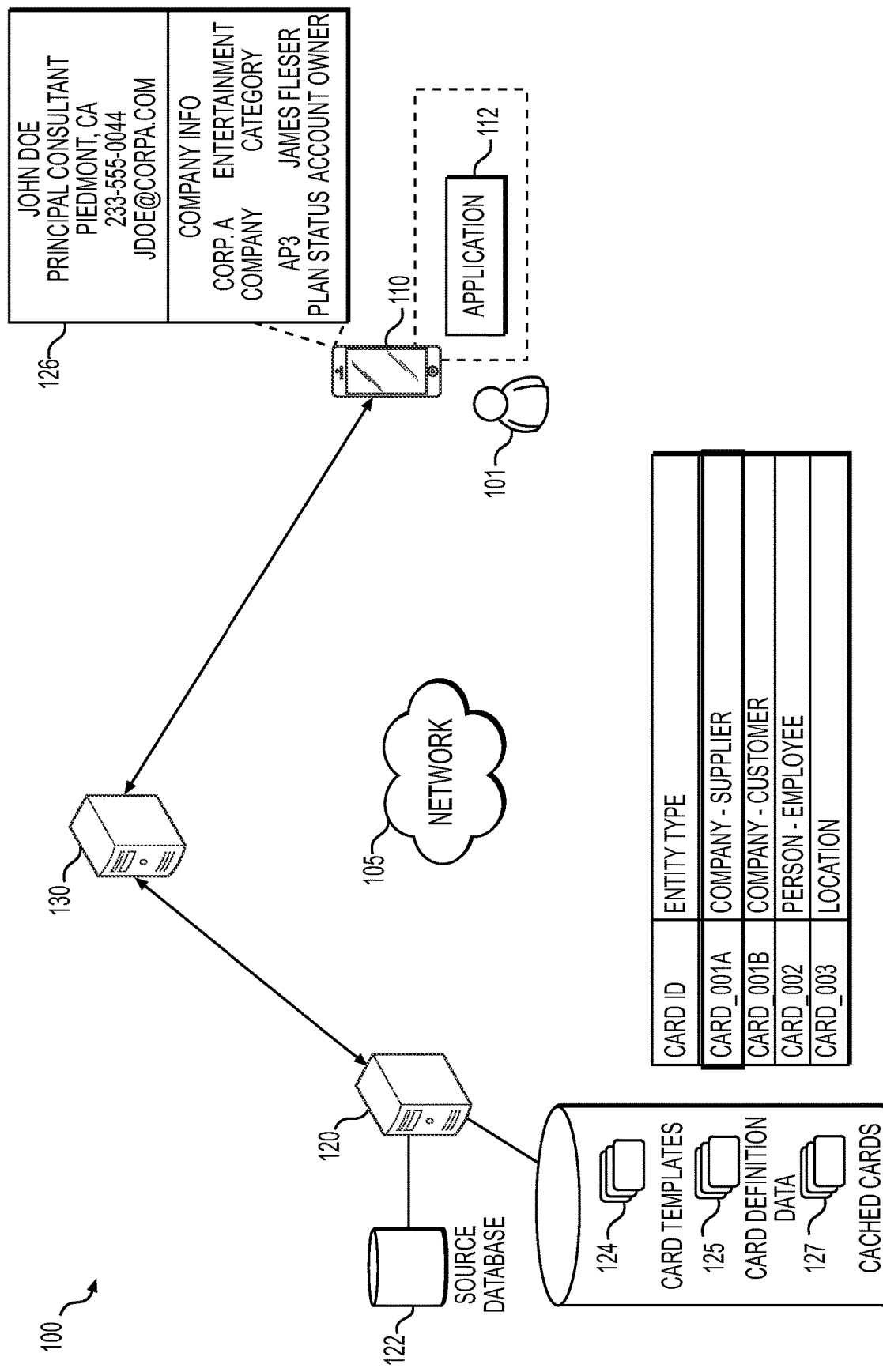
FIG. 1 shows a diagram of an exemplary system capable of generating and presenting electronic information cards at a client via a software development kit.

The following embodiments describe systems and methods for presenting electronic information to a user in a customized manner and, more particularly, to more easily integrating such electronic information retrieval and presentation functionalities in a client environment.

In the present disclosure, a computing system may facilitate generation and publication of customized information cards that can be tailored for specific organizations and users. To generate customized information cards, an administrator may select specific data sources and define a card format that draws specific types of information from those data sources. An administrator may also associate specific card formats with specific entities and keywords, such that references to those entities and keywords trigger access to or display of the information cards. An administrator may configure an information card to present a customized set of information, such as a customized subset of attributes and metrics for an entity. The information presented in the card may be drawn from a customized data source and may have a customized format.

The customized information cards may be assembled and displayed at a client side, such as through a web browser (i.e., a client-side application) capable of accessing a web site/page or a web application. One way to integrate electronic information card retrieval and presentation functionalities at the client-side application is to download and install an extension (e.g., a web browser extension) configured to perform those functionalities.

Instead of requiring end users to install an extension at the client-side application, the techniques discussed in the present disclosure provide a quicker and simpler approach to enabling the electronic information card retrieval and presentation functionalities at the client-side application. In one embodiment, a software development kit (SDK) accessible by the client enables the electronic information card retrieval and presentation functionalities at the client-side application without having to install an extension.

To provide the SDK, a web application or web site developer may simply include a code snippet in the data file (e.g., Hypertext Markup Language (HTML)) to be run by the client-side application (e.g., a web browser). For example, the code snippet may comprise a single line of code, or less than five lines of code. During execution of the data file by the client-side application, the code snippet may load and execute the SDK configured to perform various functionalities related to retrieval and presentation of the electronic information cards. For example, the client-side application requests, by way of the SDK, a plurality of keywords associated with a plurality of electronic information cards from one or more data servers. Once the plurality of keywords are received, the client-side application determines, by way of the SDK, one or more terms in the data file that match one or more keywords of the plurality of keywords. When the client-side application detects a trigger event associated with a term in the data file (e.g., when a user hovers over the term in a web page, there is a click event or mouse-over event on the term, etc.), an electronic information card associated with a keyword matching that term will be retrieved and displayed by way of the SDK.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Referring now to the appended drawings, FIG. 1 shows a diagram of an exemplary system capable of generating and presenting electronic information cards at a client via an SDK. The system 100 may include a client device 110, a master server 120, a library server 130, and a network 105. Notably, the system 100 may improve techniques to provide web developers with an easier and simplified option to integrate electronic information card retrieval and presentation functionalities with a web page or a web application.

The master server 120 may have access to a source database 122 for an entity such as, for example, an organization or a company. The server 120 may comprise a single computing device, or multiple computing devices in cooperation with each other. Each of the one or more computing devices constituting the master server 120 may be similar to or consistent with the computing device depicted in FIG. 7. While labeled a "master" server, the master server 120 is not necessarily in control when implementing the techniques discussed herein.

The client device 110 may also comprise a computing device similar to or consistent with the computing device depicted in FIG. 7, and may include an application 112 (i.e., a client-side application 112 or a client-side application 112) that enables the client device 110 to dynamically generate and display information cards in response to certain actions being performed on the client device 110. The client-side application 112 may thus monitor conditions (i.e., trigger events) of the client device 110 on an ongoing basis. More particularly, the client-side application 112 may monitor user behavior and actions occurring within the client-side application 112, such as the movement of the user's cursor within the client-side application 112, certain user actions within the client-side application 112 such as clicking or hovering over a region or content, etc. The client-side application 112 may interact with an operating system of the client device 110, for example, using one or more application programming interfaces (APIs), to obtain various types of content, such as image data and/or text displayed via the client-side application 112, and so on. The client-side application 112 may comprise a web browser capable of rendering a web page or a web application. As discussed below, the client-side application 112 may allow the client device 110 to obtain and provide information from the master server 120 either directly or indirectly (e.g., through the library server 130), in the form of information cards that can be dynamically adjusted based on the actions or conditions detected on the client device 110. In some embodiments, the client-side application 112 may comprise an application other than a web browser, which may be configured to receive information from the master server 120 either directly or indirectly (e.g., through the library server 130), in the form of information cards that can be dynamically adjusted based on the actions or conditions detected on the client device 110.

The library server 130 may be situated between the client device 110 and the master server 120, and may store (i.e., host) an SDK that may be accessed and loaded by the client-side application 112. The library server 130 may comprise one or more servers in cooperation with each other, each of the servers being similar to or consistent with the computing device depicted in FIG. 7. As briefly explained above, the SDK hosted by the library server 130 may, when executed by the client-side application 112, perform various functionalities associated with retrieval and presentation of electronic information cards within the client-side application 112. The library server 130 may serve as an intermediate server that receives data requests from the client device 110 by way of the SDK, convert such data requests to a format compatible with the master server 120, and transmit or submit the converted data requests to the master server 120 to retrieve information associated with electronic information cards. The library server 130 may also receive data responses containing information associated with electronic information cards from the master server 120, convert such data responses to a format compatible with the client device 110 or the client-side application 112, and transmit the converted data responses to the client device 110 or the client-side application 112. In one embodiment, the library server 130 may be a representational state transfer (REST) application programming interface (API) server.

The client device 110 may be associated with a user 101. When the user 101 accesses a certain web page or web application using the client-side application 112, a user identifier for the user 101 may be determined by the client-side application 112 (or the SDK loaded thereon). For example, the user 101 may log in using one or more credentials that are either automatically determined by the client-side application 112 or manually input by the user 101. The client-side application 112 or the SDK loaded thereon may then customize various aspects of the system for the user 101, including the types of electronic information cards and/or data contained therein such that the user 101 is presented only with the cards and data he/she is authorized to view.

For example, the user 101 may be a member of an organization, e.g., an employee of a company. The source database 122 may represent database records stored by or for the organization. The records may not be publicly available and are subject to data access restrictions, such as requirements that users be issued credentials from the organization that grant authorization to access the records. Different users may be granted different levels of authorization, and the master server 120 or the library server 130 may enforce access restrictions so that each user might be only allowed to access the subsets of information the user is authorized to access. Such access restrictions may be enforced once the library server 130 authenticates the user 101 based on the credentials provided at the client-side application 112. However, if the authentication fails, the user 101 may not be allowed access to the data at the master server 120 as well as the SDK hosted at the library server 130.

In FIG. 1, electronic information cards (e.g., electronic information card 126) are presented on the client device 110 as cards that include information obtained from the source database 122. The electronic information cards may be presented within the client-side application 112, by way of the SDK loaded and executed at the client-side application 112. The cards may include dynamically generated information so that they reflect changes or updates to data stored in the source database 122. For example, the server 120 may store card templates 124 that identify, for example, the content, format, and structure of the cards. The specific information that is displayed in the cards may be dynamically populated into the templates at the time the cards are determined to be relevant (e.g., upon detecting a trigger event at the client-side application 112), so that each display of a card includes information generated from up-to-date information from the source database 122. Thus, if the same card for the same entity is displayed at different times, the content may be different for each instance of the card as the information in the source database 122 changes.

The card templates 124 may include different templates for different types of entities. For example, one template may be used for a person, another template may be used for a company, another template may be used for a location (e.g., a particular store or region), and so on. Different card templates 124 may also be defined and used for entities having different semantic relationships with the user 101, the user's organization, or others. For example, a first template may be used for companies that are suppliers and may specify a first set of statistical measures to display in a card. A second template for customers may specify a different set of statistical measures to display in a card.

The system 100 may also store card-specific information in card definition data 125 that specifies the parameters of individual cards. The card templates 124 may each represent characteristics of cards for a particular type of entity or class of entities, and the card definition data 125 may specify the particular card parameters for specific entities. Although cards for different entities of the same type may use the same card template 124, each individual card may have specific information that affects its content and presentation. For example, a card definition for a specific entity may include, e.g., an entity identifier, an identifier of the card template to be used for the entity, an indication of the keywords to be used to trigger presentation of the card for the entity, a mapping of data source elements to the components of the card template (if not already specified in the card templates 124), and so on. For example, a card definition for a company "Example Co." may specify that the "CARD_001A" template should be used, and that the specific set of keywords that trigger display of that company's card are "Example Co.," "Example," and "EC." The card definition data 125 may include a card definition record for each information card made available in the system 100. The card definition data 125 may also be used to customize (e.g., alter or override) aspects of the card templates.

With continuing reference to FIG. 1, the client-side application 112 on the client device 110, or more particularly the SDK executed by the client-side application 112, may detect a trigger event, such as a user 101 interacting with a keyword representing an entity having corresponding information in the database 122. For example, the client-side application 112 may detect, by way of the SDK, the user 101 hovering over a term that matches a keyword associated with an electronic information card of an entity. The client-side application 112 may cause the client device 110 to request data associated with the electronic information card from the library server 130 (i.e., make a data request to the library server 130), and the library server 130 may submit an appropriate request to the master server 120 based on the data request from the client device 110. In response, the master server 120 may determine appropriate information to include in a data response and send the data response to the library server 130, and the library server 130 may transmit an appropriate response to the client device 110 based on the data response received from the master server 120. The client-side application 112 may then render the electronic information card within its display or interface utilizing the information contained in the data response. This process is explained in further detail below with respect to various stages illustrated in FIG. 3.

Figure 2:
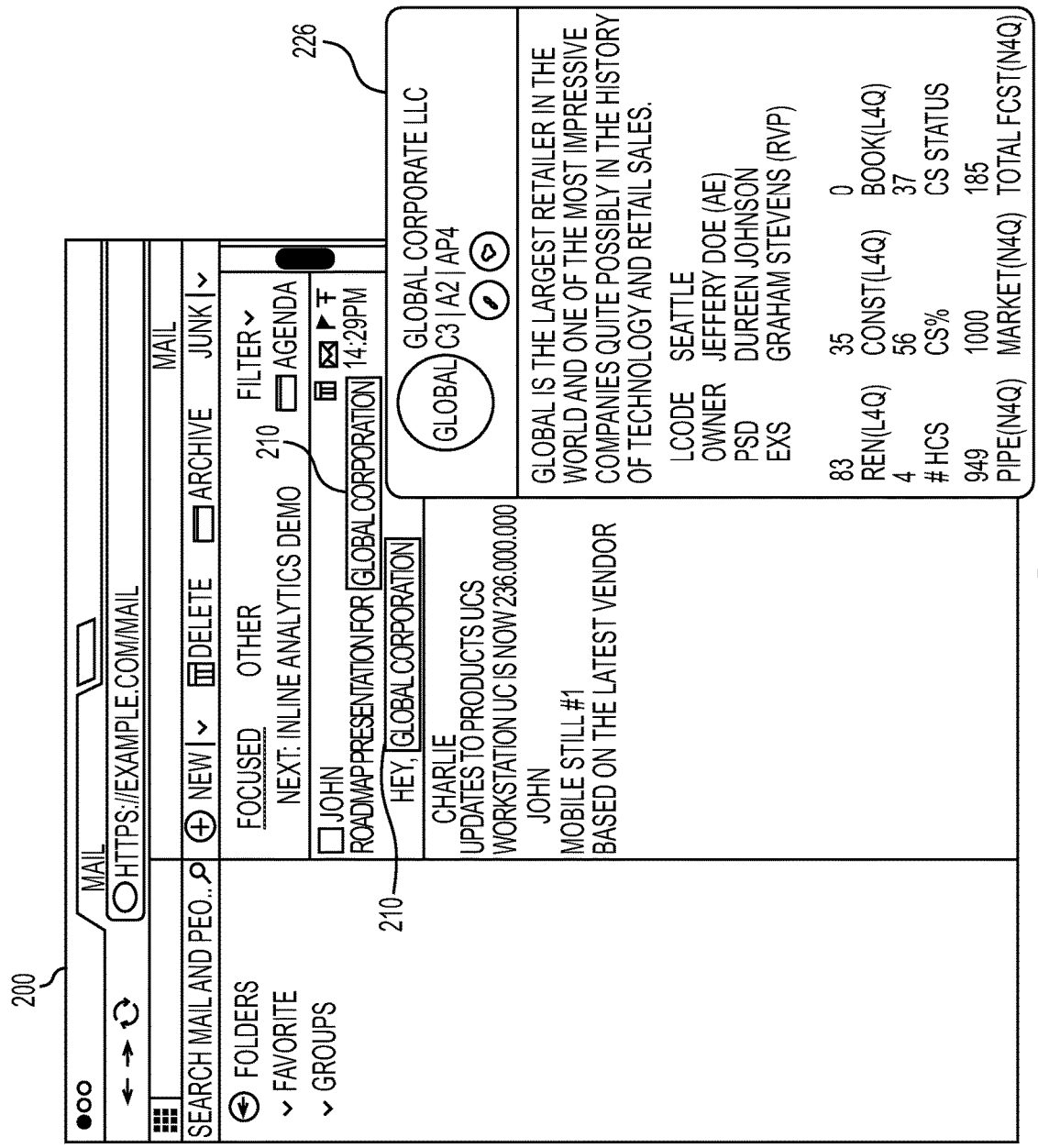
FIG. 2 shows an exemplary user interface displaying an electronic information card in response to a trigger event, according to one aspect of the present disclosure.

FIG. 2 shows an exemplary user interface displaying an electronic information card in response to a trigger event, according to one aspect of the present disclosure. The user interface 200 is one that may be provided by the client device 110. The particular example illustrated shows the client-side application 112 as a web browser. However, as discussed above, it should be understood that the client-side application 112 may be any software application capable of providing a user interface based on a script or data file. In FIG. 2, the client-side application 112 renders a web page providing information from a user's email account. Upon navigating to the web page, the client device 110 may obtain a data file, such as an HTML file expressing the content to be displayed, e.g., content of the web page, and may check the content for matches with a set of keywords, e.g., keywords that are associated with an organization of the user and that have corresponding electronic information cards. The set of keywords may be received from one or more data servers (e.g., from the master server 120 through the library server 130 acting as an intermediary). The keyword retrieval and match determination may be performed using an SDK, which may be obtained from the library server 130 via a code snippet included in the HTML file configured to "call" the SDK. As discussed above, each of the keywords may have corresponding information in a database (e.g., source database 122). A keyword may refer to a particular entity, and the entity may have a particular information card template and definition data associated with it.

In FIG. 2, after navigating to the web page shown in the user interface 200, the client device 110 may determine, by way of the SDK, that the phrase "Global Corporation" matches an entry in the list of keywords. In response, the client device 110 may annotate, using the SDK, each instance 210 of this term in the user interface 200, shown here by a box around the term. Other types of annotations that are simpler or more complicated may be additionally or alternatively used (e.g., underlining, bolding, italicizing, highlighting, color-coding, etc.). Each instance of the matching term may also be made interactive.

When the user 101 interacts with an instance 210 of the matching term, the client device 110 may display an electronic information card 226 corresponding to an entity represented by the term. As illustrated, the interaction may be a mouse-over event (i.e., a hover-over event) where a cursor rests on or near the annotated term for at least a minimum amount of time. This interaction may trigger the client device 110 to request data associated with a corresponding electronic information card (e.g., electronic information card rendering data) from the master sever 120 via the library server 130. The displayed electronic information card 226 may include any of various types of information relating to the entity indicated by the keyword, such as values from a database, statistics, metrics, visualizations, links to further information, quantitative or qualitative ratings related to the entity, contact details of the entity, and so on.

In some embodiments, to allow the client device 110 to obtain the data for the electronic information card 226, the master server 120 may (1) map an identified keyword indicated by the client device 110 to a specific entity, (2) select an information card template corresponding to the specific entity or a type or classification of that entity, and (3) retrieve information from a database relating to the specific entity, according to the types of information specified by the selected information card template. Alternatively, steps (1) and (2) may be performed by the library server 130 and/or the client device 110. The master server 120 may then send the retrieved information for the electronic information card 226 to the client device for display. As discussed above, the data for the electronic information card 226 may first be transmitted to the library server 130, which will convert the data response to a format compatible with the client device 110. This process may be performed in substantially real time.

In some embodiments, the client-side application 112, or more particularly the SDK executed by the client-side application 112, may make a REST API request to obtain a list of keywords. These may be obtained by the master server 120 from card metadata, such as by identifying attributes specified by card templates 124 and extracting values for the attributes from the underlying data set(s) used to generate cards. The keywords may also be specified in other card definition data 125, in metadata repositories, caches, and so on. The SDK may cache the set of received keywords in cache or any other storage associated with (or reserved for) the client-side application 112. The SDK may also examine content of the browsed page to determine if content of the page matches any of the received keywords. When a match is found, the SDK may annotate (e.g., highlight or otherwise visually distinguish) the matching term and/or make the annotated term interactive. The SDK may then detect a trigger event associated with the annotated term, such as a mouse cursor hovering over the annotated term. Upon detecting the trigger event, the SDK may make a REST API call to get the data corresponding to the annotated term from the source data set, in order to display the electronic information card associated with the annotated term within the client-side application 112. The master server 120 may provide the electronic information card rendering data, such as HTML and/or cascading style sheets (CSS) data that constitute the content for the card. Upon receiving the rendering data, the SDK may display the card based on the received data. In displaying the card, the SDK may modify content of one or more data files representing the web page. Such data files may include one or more of an HTML file, a CSS file, and the like. In some embodiments, the card content may be preloaded on the client device 110 in response to finding keywords in a page, before a user 101 interacts with any annotated terms.

The SDK may also allow the user 101 to copy the image of an electronic information card displayed within the client-side application 112, and share the copied image with other users. Further, the SDK may provide an ability for the user 101 to turn the electronic information cards on and off via a custom user interface component. Furthermore, the SDK may be configured to generate a log of some or all the transactions performed by the SDK and statuses thereof, such that the log may be used for troubleshooting. However, any of these functionalities may be enabled or disabled by the user 101 or the developer to ensure there is no negative impact to the client-side performance.

Figure 3:
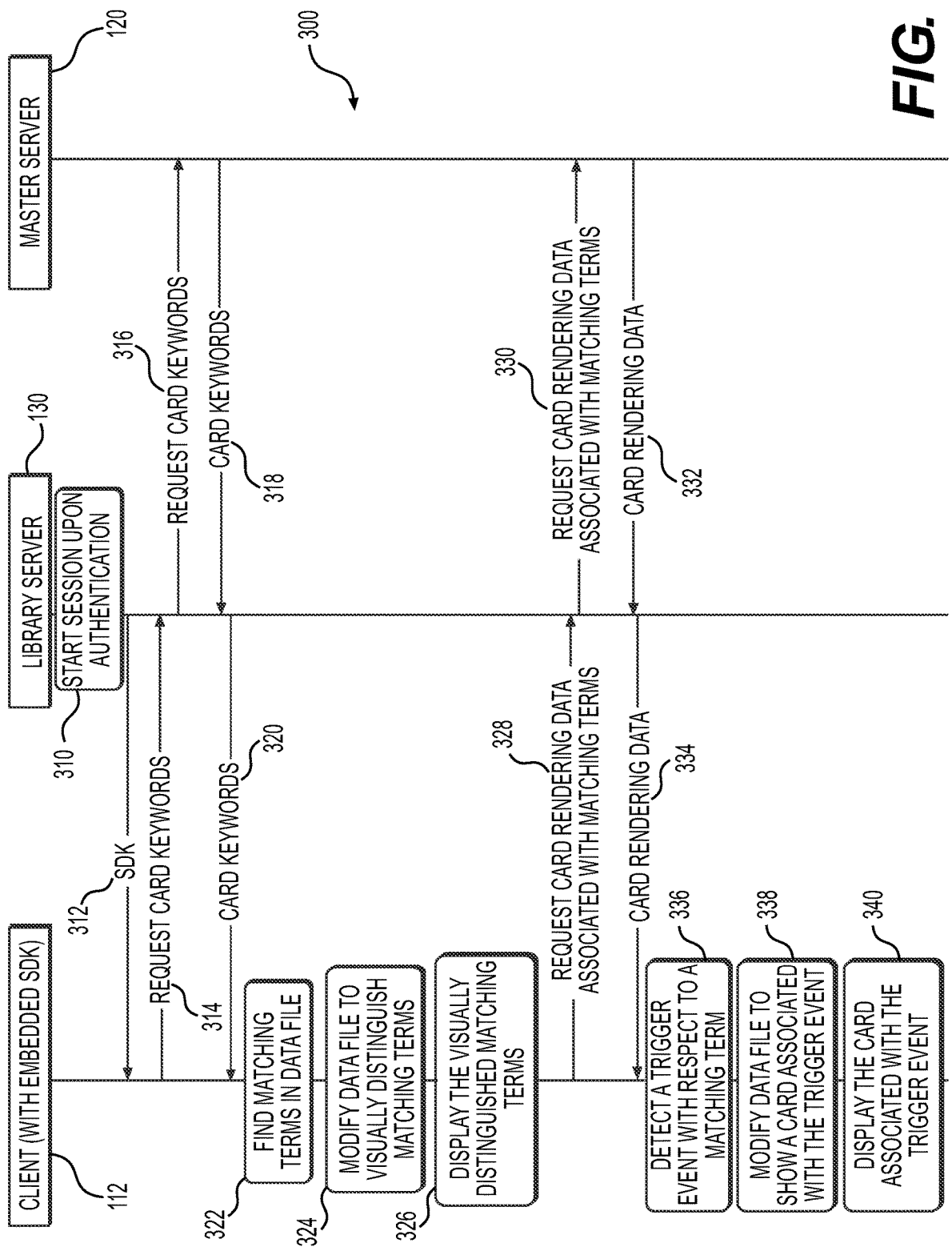
FIG. 3 shows a flowchart illustrating an exemplary method of presenting electronic information cards at a client using a software development kit, according to one aspect of the present disclosure.

FIG. 3 shows a flowchart 300 illustrating an exemplary method of presenting electronic information cards at a client using an SDK, according to one aspect of the present disclosure. In particular, FIG. 3 illustrates the interplay between the client-side application 112 installed on the client device 110, the library server 130, and the master server 120 of the system 100.

At step 310, the library server 130 may start a session upon authenticating the user 101 of the client-side application 112, based on user credentials provided by the user 101 via the client-side application 112. The process of authenticating the user 101 will be described in further detail below in reference to FIG. 6. Upon starting the session, the SDK hosted at the library server 130 may become available for access by the client-side application 112. Therefore, at step 312, the client-side application 112 may load the SDK from the library server 130, in order perform various functionalities enabled by the SDK. The SDK hosted at the library server 130 may be called by the client-side application 112 when the client-side application 112 executes a data file representing the web page or web application being navigated, for example, an HTML file. Particularly, the data file may include a code snippet configured to call and load the SDK into the client-side application 112. As an example, such a code snippet may define a source from which the SDK (or a corresponding JavaScript (JS) file, e.g., .jsp or .js file) may be loaded.

At step 314, the client-side application 112 may request, by way of the SDK, a plurality of keywords associated with a plurality of corresponding electronic information cards. As discussed above, the data request may be an API request. The data request made by the client-side application 112 may be transmitted to the library server 130 as illustrated in FIG. 3. The library server 130 may then convert the data request to a format that is compatible with the master server 120. At step 316, the library server 130 may send the converted data request to the master server 120, which may access the source database 122 to retrieve and aggregate the plurality of keywords originally requested by the client-side application 112.

At step 318, the master server 120 may transmit a data response including the requested plurality of keywords to the library server 130. The library server 130 may then convert the data response to a format compatible with the client-side application 112, and at step 320, transmit the converted data response including the plurality of keywords to the client-side application 112. As explained above, the received keywords may be stored in cache and/or any other storage associated with the client-side application 112.

Upon receiving the plurality of keywords, at step 322, the client-side application 112 may examine, by way of the SDK, one or more data files representative of the web page (or web application) being navigated, to identify terms within the content of the web page that match the keywords. Optionally, at step 324, the client-side application 112 may modify, by way of the SDK, the one or more data files (or modify a display generated based on the one or more data files) to visually distinguish the identified matching terms. At step 326, the client-side application 112 may display the visually-distinguished matching terms in the web page.

At step 328, the client-side application 112 may request, by way of the SDK, electronic information card rendering data associated with the identified matching terms. In other words, the client-side application 112 may determine, by way of the SDK, electronic information cards that correspond to keywords matching the terms in the web page, and may request electronic information card rendering data associated with those electronic information cards. The data request may be an API request. The data request may first be transmitted to the library server 130. The library server 130 may then convert the data request to a format that is compatible with the master server 120. At step 330, the library server 130 may send the converted data request to the master server 120, which may access the source database 122 to retrieve and assemble the electronic information card rendering data originally requested by the client-side application 112. The electronic information card rendering data may comprise one or more of an HTML data and a CSS data representative of the electronic information cards, which may be used by the client-side application 112 to display the electronic information cards within the web page.

At step 332, the master server 120 may transmit a data response including the electronic information card rendering data to the library server 130. The library server 130 may then convert the data response to a format compatible with the client-side application 112, and at step 334, transmit the converted data response including the electronic information card rendering data to the client-side application 112. As explained above, the received electronic information card rendering data may be stored in cache and/or any other storage associated with the client-side application 112.

Upon receiving the electronic information card rendering data, at step 336, the client-side application 112 may monitor, by way of the SDK, user activity on the web page such as, for example, a user hovering over a matching term identified in the web page, and may detect such a trigger event at the time of its occurrence (i.e., substantially in real time). At step 338, the client-side application 112 may modify, by way of the SDK, the one or more data files (or modify a display generated based on the one or more data files) to display an electronic information card associated with the trigger event. More particularly, if the client-side application 112 has detected that the user has been hovering over a term identified in the web page, the client-side application 112 may modify the display such that the electronic information card associated with a keyword matching that term is displayed on the web page. The modification may be performed using at least a portion of the received electronic information card rendering data that corresponds to the electronic information card to be displayed. At step 340, the client-side application 112 may display the electronic information card associated with the trigger event in the web page.

Alternatively, instead of requesting electronic information card rendering data for all of the matching terms identified in the web page as shown in step 328, the data request for the electronic information card rendering data may be made on-demand. In other words, the electronic information card rendering data for a particular electronic information card may be made once a trigger event has been detected in relation to a term (that matches one of the keywords received from the master server 120) within the web page.

Figure 4:
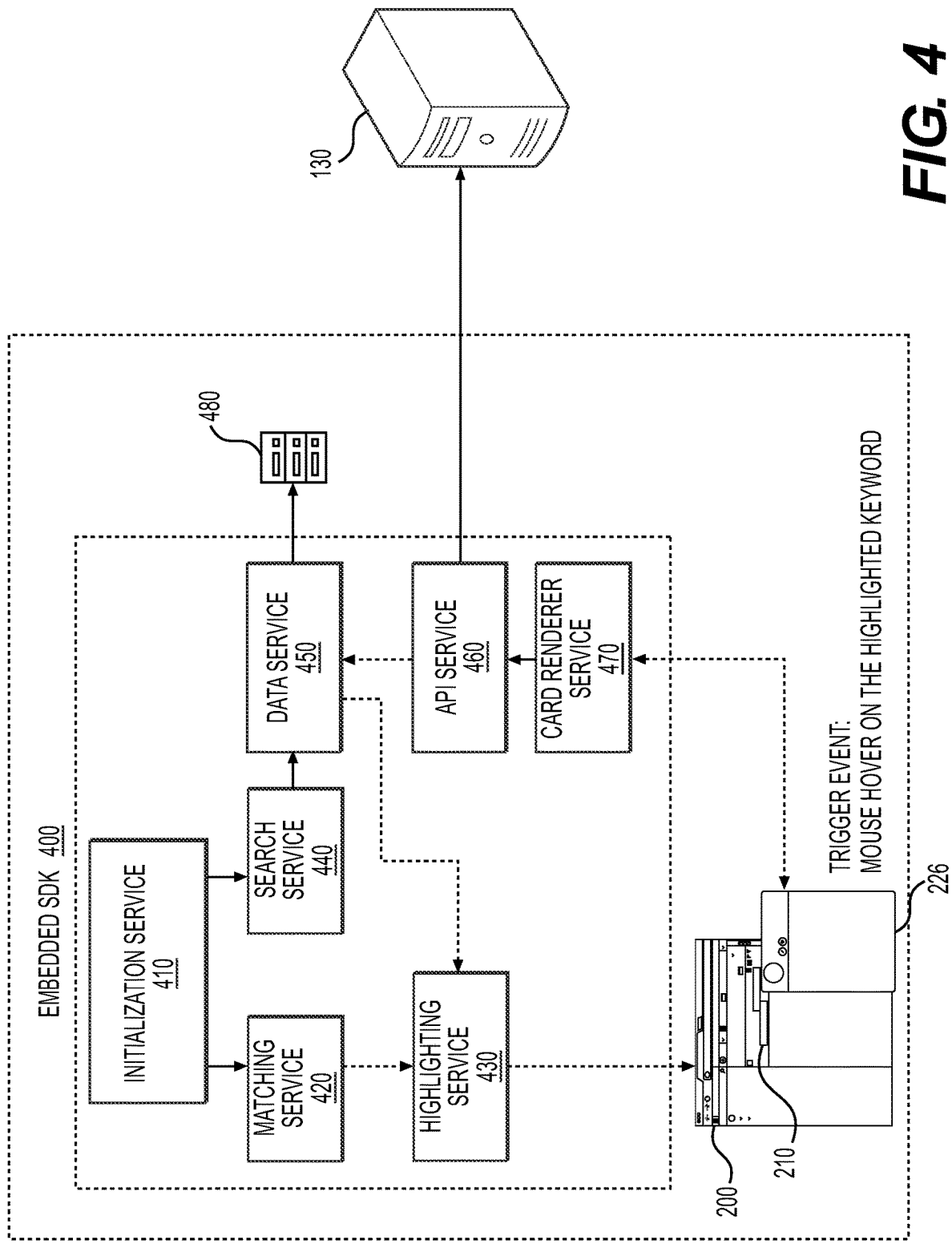
FIG. 4 shows a diagram of an exemplary software development kit configured to display electronic information cards at a client-side application, according to one aspect of the present disclosure.

FIG. 4 shows a diagram of an exemplary SDK configured to display electronic information cards in a client-side application, according to one aspect of the present disclosure. The SDK proposed by the current disclosure, which may be hosted at the library server 130 and loaded by the client-side application 112 via a code snippet included in a data file, may comprise multiple components. As shown in FIG. 4, an SDK 400 may comprise an initialization service 410, matching service 420, highlighting service 430, search service 440, data service 450, API service 460, and card renderer service 470. All or a portion of these components may be connected with a messaging service (i.e., a messenger, not shown in FIG. 4 for brevity). Some or all of the interfaces of the messenger may be overridden, which provides the flexibility to customize the SDK to perform different functionalities. A default messenger may wrap the interfaces of the data service 450, highlighting service 430, card renderer service 470, matching service 420, and initialization service 410. The API service 460 may be called directly from the data service 450 and initialization service 410.

The initialization service 410 may include an authentication service component that initiates an authentication procedure with the library server 130. The initialization service 410 may support one or more authentication protocols including identity provider (IDP) authentication (e.g., Security Assertion Markup Language (SAML), OpenID Connect (OIDC), Trusted, etc.), Guest or Kerberos, Standard or Lightweight Directory Access Protocol (LDAP), etc. The authentication process may use AuthToken (string) or identityToken as the authentication token regardless of the original login mode, which will allow the token to be reused across the same domain. An exemplary authentication process performed between the client-side application 112, the library server 130, and an authentication server (i.e., authentication server 650 in FIG. 6) will be discussed in greater detail below in reference to FIG. 6.

Once the initialization service 410 completes the authentication process and begins a session, the library server 130 may provide the client-side application 112 with access to a JS file of the SDK, allowing the client-side application 112 to load the SDK and utilize its various functionalities. Once the SDK is loaded at the client-side application 112, the initialization service 410 may download a list of keywords associated with multiple electronic information cards. To request and download the keywords, the initialization service 410 may make an API request (e.g., Get card elements) to the library server 130, which may in turn request and retrieve the keywords from the master server 120. The downloaded keywords may be stored in cache or any other storage associated with the client-side application 112 (e.g., an external storage 480). In some embodiments, the step of requesting and downloading the keywords may be performed by the data service 450.

With continuing reference to FIG. 4, the data service 450 may download data including card definition, card elements, and card list utilizing the API service supported by the library server 130. The data service 450 may manage the cache and auto refresh functionality to keep the data up to date, and also manage any other storage associated with the client-side application 112 (e.g., loading data from and saving data to an external data storage 480).

For the auto fresh functionality, the data associated with electronic information cards (i.e., card data) stored in the cache and/or any other storage associated with the client-side application 112 may be refreshed every time card data are received from one or more servers (e.g., from the master server 120 via the library server 130). The data service 450 may also perform a check every time a different component of the SDK 400 wants to pull data. Such a check may include refreshing all card data and validating existing card data in the cache. In one embodiment, for each card to be validated, the data service 450 may send an API request (e.g., GET/objects/id) to receive card information including cardName, cardModifiedTime, etc., and validate the existing card data based on the cardModifiedTime and cacheId. If the existing card data is determined to be invalid, the data service 450 may remove the existing card data from the cache and/or other storage. If the card data is removed from the cache and/or other storage, the data service 450 may request updated card data from the one or more servers next time a corresponding electronic information card needs to be provided to the user 101.

The data service 450 may also clear the cache or other storage by setting an expiration time or relying on a cleanup operation already in place in the event that the client-side application 112 (e.g., a web browser) reaches a quota limit. The data service 450 may be configured to determine whether desired data are located in the cache, other storage, or should be downloaded from the master server 120 and stored in the cache or other storage. Based on the determination, the data service 450 may retrieve the desired data from the cache, other storage, or the master server 120 by way of the API service supported by the library server 130. In one embodiment, the data service 450 may attempt to retrieve the desired data from the cache first, but if the data is missing in the cache, attempt to retrieve the data from the other storage as the next option, as retrieving data from a server will take longer than the cache or other storage.

The matching service 420 may match the keywords received from the one or more servers with terms appearing in the page or interface rendered by the client-side application 112. As explained above, the matching service 420 may identify matching terms by iterating through a data file representative of the page (e.g., an HTML file), which may contain text content of the page or interface. To that end, the matching service 420 may cache one or more matchers, one matcher per card. A matcher may be a trie matcher or a pattern matcher. A trie matcher may be configured to create a trie tree object, extract keywords from the text content within the data file, serialize the trie tree to string, and restore the trie tree from the string. A pattern matcher may create a pattern match object, extract keywords from the text content within the data file, and validate the keywords with the data service 450 and return valid matches. Each output indicating a matching term (i.e., a term within the page/interface that matches a keyword associated with an electronic information card) may be in the form of {keyword, start, end, matches:[cardSetId, cardId]}. In some embodiments, the matching service 420 may be executed at the one or more servers instead of being run at the client device 110, such that the client device 110 does not need to download card elements.

The search service 440 may determine electronic information cards that correspond to the matching terms identified by the matching service 420. The search service 440 may determine which of the keywords from the one or more servers has a corresponding matching term in the page. Once the keywords that have corresponding matching terms in the page have been identified, the search service 440 may determine the electronic information cards associated with those keywords. The search service 440 may provide the data service 450 with information identifying the electronic information cards that have matching terms in the page (e.g., by returning matched card information in the form of {cardId, projectId, elementId}), such that the data service 450 may request and receive additional data needed for injecting the cards into the page.

Once the matching terms have been identified in the page, the matching service 420 may also call the highlighting service 430 to modify the display, to visually distinguish the matching terms on the page. More particularly, the highlighting service 430 may modify the data file representative of the page to underline the matching terms. However, underlining is merely an example and the matching terms may be visually distinguished (i.e., annotated) through other means such as by making the terms bolded, italicized, highlighted, color-coded, etc. The highlighting service 430 may also link the underlined matching term to the card renderer service 470 for display of the corresponding electronic information card.

The card renderer service 470 may hold one or more card renderers, one renderer per card. The required input to each card renderer may be {cardSetId, cardId}, which for example can be identified from the output of the matching service 420. Once the input has been received, the card renderer service 470 may utilize electronic information card rendering data (e.g., HTML and/or CSS data) requested and received from the one or more servers (e.g., via Get card HTML and/or Get card CSS) to inject the electronic information card into the page. As explained above, an electronic information card that corresponds to a matching term in the page may be rendered once a trigger event (e.g., when the user hovers over the annotated matching term) has been detected. The step of rendering the electronic information card within the page may involve modifying one or more data files representative of the page displayed in the client-side application 112 (e.g., HTML and/or CSS files), using the electronic information card rendering data received from the one or more servers.

Additionally or optionally, the search service 440 may enable a keyword search functionality, where the user may search among keywords received from the one or more servers, or to search among matching terms identified in the page/interface (i.e., a term within the page/interface that matches a keyword associated with an electronic information card). Also, if the user finds that one or more cards that should be rendered based on terms appearing in the page/interface are not actually being rendered on the page/interface, the user may be provided with an option to quickly search for one or keywords, among the keywords received from the one or more servers, that correspond to the one or more cards that should have been rendered. For instance, the search service 440 may provide the user with a card search functionality, where the user may get a list of cards by specifying the cards directly with card properties or using a card filter (e.g., can filter by "certified only," "owned by current user only," etc.) to get a list of cards via a quick search.

The API service 460 may communicate with other components of the SDK 400 and transmit API requests to the library server 130 on behalf of those components. For example, the API service 460 may make API requests on behalf of the data service 450 (e.g., Get card list, Get card definition, Get card elements, etc.) to receive various data associated with electronic information cards, such as a card list, card definitions, card elements, etc. Further, the API service 460 may make API requests on behalf of the card renderer service 470 (e.g., Get card HTML, Get card CSS, etc.) to receive electronic information card rendering data.

Figure 5:
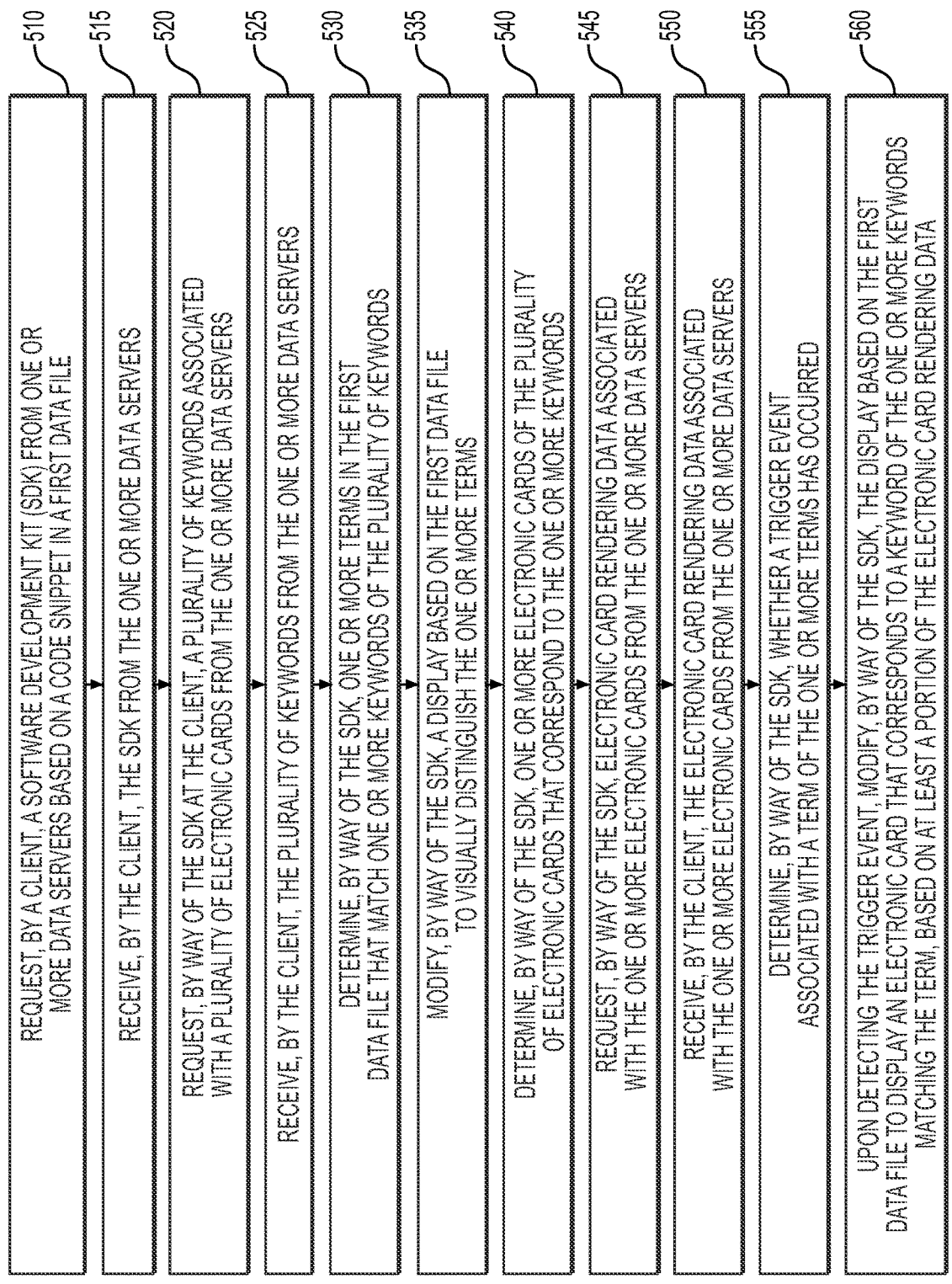
FIG. 5 shows a flowchart illustrating an exemplary method of modifying a display at a client to present an electronic information card using a software development kit, according to one aspect of the present disclosure.

FIG. 5 shows a flowchart 500 illustrating an exemplary method of modifying a display at a client to present an electronic information card using an SDK, according to one aspect of the present disclosure. At step 510, a client-side application 112 (e.g., a web browser) may request an SDK from one or more data servers (e.g., from the master server 120 via the library server 130) based on a code snippet in a first data file (e.g., an HTML file). At step 515, the client-side application 112 may receive the SDK from the one or more data servers upon authenticating the user of the client-side application 112. Such authentication may be performed solely by the library server 130, or by the library server in cooperation with an additional server (e.g., an IDP server) using a now-known or later-developed authentication protocol such as SAML, OIDC, Trusted, Guest or Kerberos, Standard or LDAP, etc.

At step 520, the client-side application 112 may request, by way of the SDK, a plurality of keywords associated with a plurality of electronic information cards from the one or more data servers. At step 525, the client-side application 112 may receive the plurality of keywords from the one or more data servers. At step 530, the client-side application 112 may determine, by way of the SDK, one or more terms in the first data file that match one or more keywords of the plurality of keywords received from the one or more data servers. At step 535, the client-side application 112 may modify, by way of the SDK, a display based on the first data file to visually distinguish the one or more terms. In one embodiment, the first data file may be modified to annotate the one or more terms via highlighting, bolding, italicizing, color-coding, underlining, etc. At step 540, the client-side application 112 may determine, by way of the SDK, one or more electronic information cards of the plurality of electronic information cards that correspond to the one or more keywords.

At step 545, the client-side application 112 may request, by way of the SDK, electronic information card rendering data (e.g., HTML and/or CSS data) associated with the one or more electronic information cards from the one or more data servers. At step 550, the client-side application 112 may receive the electronic information card rendering data associated with the one or more electronic information cards from the one or more data servers. At step 555, the client-side application 112 may determine, by way of the SDK, whether a trigger event associated with a term of the one or more terms has occurred (e.g., a user hovering over a matched term). At step 560, upon detecting the trigger event, the client-side application 112 may modify, by way of the SDK, the display based on the first data file to display an electronic information card that corresponds to a keyword of the one or more keywords matching the term, based on at least a portion of the electronic information card rendering data. In one embodiment, the first data file and/or an additional data file (e.g., a CSS file) may be modified using the received electronic information card rendering data, to inject the electronic information cards into the display of the client-side application 112.

Figure 6:
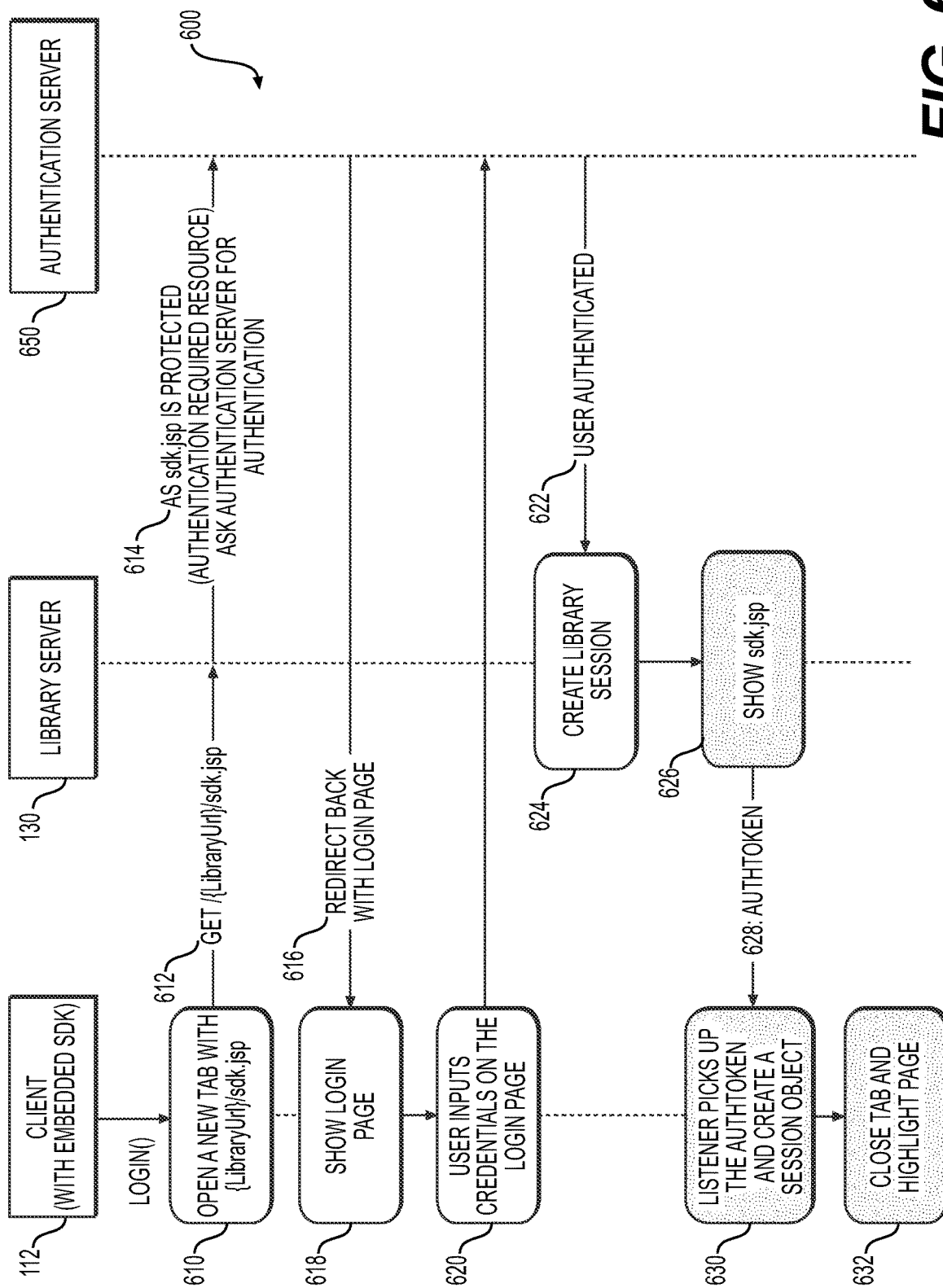
FIG. 6 shows a flowchart illustrating an exemplary method of authenticating a client to provide access to a software development kit, according to one aspect of the present disclosure.

FIG. 6 shows a flowchart 600 illustrating an exemplary method of authenticating a client to gain access to an SDK, according to one aspect of the present disclosure. As explained above, in order for the client-side application 112 to gain access to the SDK (e.g., JS file) hosted at the library server 130, a user of the client-side application 112 may need to be authenticated first. In the example of FIG. 6, an authentication process utilizing an authentication server 650 (e.g., an IDP server 650) is illustrated. The authentication process depicted in FIG. 6 may utilize an SAML, Trusted, or OIDC authentication protocol.

First, the client-side application 112 may request, by way of the SDK, a login to the library server 130 in order to access the functionalities of the SDK (e.g., via a JS file). At step 610, the client-side application 112 may open a new tab with {LibraryUrl}/sdk.jsp. At step 612, the client-side application 112 may make an API request, e.g., GET /{LibraryUrl}/sdk.jsp, to the library server 130. Upon receiving the API request, at step 614, the library server 130 may ask the authentication server 650 to start an authentication process as the sdk.jsp is a protected, authentication-required resource. In response, at step 616, the authentication server 650 may provide a login page to the client-side application 112.

At step 618, the client-side application 112 may display the login page. At step 620, the user of the client-side application 112 may input credentials on the login page. The login credentials may then be transmitted to the authentication server 650 to be verified. Once the authentication server 650 has verified the credentials, at step 622, the authentication server 650 transmits a message indicating that the user has been authenticated to the library server 130.

Upon receiving the message indicating successful authentication, at step 624, the library server 130 may create a library session with the client-side application 112. At step 626, the library server 130 may provide the sdk.jsp via the established library session. At step 628, the library server 130 may transmit an authentication token (e.g., authToken) to the client-side application 112. At step 630, the client-side application 112 may pick up the authentication token via a listener, set the authentication token, and create a session object. At step 632, the client-side application 112 may close the tab and proceed with performing various functionalities enabled by the SDK discussed above, such as downloading keywords, highlighting the page, detecting trigger events, and displaying electronic information cards within the client-side application 112.

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 7 illustrates an implementation of a computer system that may execute techniques presented herein. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices.

In a networked deployment, the computer system 700 may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 700 can be implemented using electronic devices that provide voice, video, or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. The processor 702 may be a component in a variety of systems. For example, the processor 702 may be part of a standard personal computer or a workstation. The processor 702 may be one or more general processors, digital signal processors, application specific integrated circuits, field programmable gate arrays, servers, networks, digital circuits, analog circuits, combinations thereof, or other now known or later developed devices for analyzing and processing data. The processor 702 may implement a software program, such as code generated manually (i.e., programmed).

The computer system 700 may include a memory 704 that can communicate via a bus 708. The memory 704 may be a main memory, a static memory, or a dynamic memory. The memory 704 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 704 includes a cache or random-access memory for the processor 702. In alternative implementations, the memory 704 is separate from the processor 702, such as a cache memory of a processor, the system memory, or other memory. The memory 704 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 704 is operable to store instructions executable by the processor 702. The functions, acts or tasks illustrated in the figures or described herein may be performed by the programmed processor 702 executing the instructions stored in the memory 704. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 700 may further include a display unit 710, such as a liquid crystal display (LCD), an organic light emitting diode (OLED), a flat panel display, a solid-state display, a cathode ray tube (CRT), a projector, a printer or other now known or later developed display device for outputting determined information. The display 710 may act as an interface for the user to see the functioning of the processor 702, or specifically as an interface with the software stored in the memory 704 or in the drive unit 706.

Additionally or alternatively, the computer system 700 may include an input device 712 configured to allow a user to interact with any of the components of system 1000. The input device 712 may be a number pad, a keyboard, or a cursor control device, such as a mouse, or a joystick, touch screen display, remote control, or any other device operative to interact with the computer system 700.

The computer system 700 may also or alternatively include a disk or optical drive unit 706. The disk drive unit 706 may include a computer-readable medium 722 in which one or more sets of instructions 724, e.g. software, can be embedded. Further, the instructions 724 may embody one or more of the methods or logic as described herein. The instructions 724 may reside completely or partially within the memory 704 and/or within the processor 702 during execution by the computer system 700. The memory 704 and the processor 702 also may include computer-readable media as discussed above.

In some systems, a computer-readable medium 722 includes instructions 724 or receives and executes instructions 724 responsive to a propagated signal so that a device connected to a network 750 can communicate voice, video, audio, images, or any other data over the network 750. Further, the instructions 724 may be transmitted or received over the network 750 via a communication port or interface 720, and/or using a bus 708. The communication port or interface 720 may be a part of the processor 702 or may be a separate component. The communication port 720 may be created in software or may be a physical connection in hardware. The communication port 720 may be configured to connect with a network 750, external media, the display 710, or any other components in system 700, or combinations thereof. The connection with the network 750 may be a physical connection, such as a wired Ethernet connection or may be established wirelessly as discussed below. Likewise, the additional connections with other components of the system 700 may be physical connections or may be established wirelessly. The network 750 may alternatively be directly connected to the bus 708.

While the computer-readable medium 722 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 722 may be non-transitory, and may be tangible.

The computer-readable medium 722 can include a solid-state memory such as a memory card or other package that houses one or more non-volatile read-only memories. The computer-readable medium 722 can be a random-access memory or other volatile re-writable memory. Additionally or alternatively, the computer-readable medium 722 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 700 may be connected to one or more networks 750. The network 750 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 750 may include wide area networks (WAN), such as the Internet, local area networks (LAN), campus area networks, metropolitan area networks, a direct connection such as through a Universal Serial Bus (USB) port, or any other networks that may allow for data communication. The network 750 may be configured to couple one computing device to another computing device to enable communication of data between the devices. The network 750 may generally be enabled to employ any form of machine-readable media for communicating information from one device to another. The network 750 may include communication methods by which information may travel between computing devices. The network 750 may be divided into sub-networks. The sub-networks may allow access to all of the other components connected thereto or the sub-networks may restrict access between the components. The network 750 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the present disclosure are sometimes grouped together in a single embodiment, figure, or description thereof for the purpose of streamlining the disclosure and aiding in the understanding of one or more of the various aspects. This method of disclosure, however, is not to be interpreted as reflecting an intention that the claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the disclosed techniques.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method of integrating electronic information card display at a client via a software development kit (SDK) provided at one or more data servers, the method comprising:

requesting, by the client, the SDK from the one or more data servers based on a code snippet in a first data file;

receiving, by the client, the SDK from the one or more data servers;

requesting, by way of the SDK at the client, a plurality of keywords specific to an organization of a current user of the client and associated with a plurality of electronic information cards from the one or more data servers;

receiving, by the client, the plurality of keywords specific to the organization of the current user of the client from the one or more data servers;

determining, by way of the SDK, one or more terms in the first data file that match one or more keywords of the plurality of keywords specific to the organization of the current user of the client;

determining, by way of the SDK, one or more electronic information cards of the plurality of electronic information cards that correspond to the one or more keywords specific to the organization of the current user of the client;

requesting, by way of the SDK, electronic information card rendering data associated with the one or more electronic information cards from the one or more data servers;

receiving, by the client, the electronic information card rendering data associated with the one or more electronic information cards from the one or more data servers;

determining, by way of the SDK, whether a trigger event associated with a term of the one or more terms has occurred; and upon detecting the trigger event, modifying, by way of the SDK, a display based on the first data file to display an electronic information card that corresponds to a keyword of the one or more keywords matching the term, based on at least a portion of the electronic information card rendering data.

2. The computer-implemented method of claim 1 further comprising, prior to receiving the SDK from the one or more data servers:

sending, by the client, an authentication request to the one or more data servers; and receiving, by the client, an authentication response from the one or more data servers.

3. The computer-implemented method of claim 2, wherein the one or more data servers comprise a library server further in communication with an identity provider (IDP) server.

4. The computer-implemented method of claim 3, wherein the library server supports security assertion markup language (SAML), OpenID Connect (OIDC), or Trusted to enable web-based single sign-on.

5. The computer-implemented method of claim 1, wherein the one or more data servers comprise a library server, and wherein the code snippet is a JavaScript code configured to load the SDK from the library server.

6. The computer-implemented method of claim 1, wherein the first data file is a Hypertext Markup Language (HTML) file.

7. The computer-implemented method of claim 6, wherein the display is further based on a second data file, the second data file comprising a Cascading Style Sheets (CSS) file.

8. The computer-implemented method of claim 1, wherein the one or more data servers comprise a master server, wherein the plurality of keywords and the electronic information card rendering data are requested from the master server via application programming interface (API) requests.

9. The computer-implemented method of claim 1, wherein the received plurality of keywords are stored in a cache.

10. The computer-implemented method of claim 1, wherein the electronic information card that corresponds to the keyword of the one or more keywords matching the term is displayed on a web page or a web-based application.

11. The computer-implemented method of claim 10, wherein the keyword of the one or more keywords matching the term is also displayed on the web page or the web-based application, the displayed keywords being at least one of: underlined, bolded, italicized, bolded, and highlighted.

12. The computer-implemented method of claim 1, wherein the electronic information card rendering data comprises:

Hypertext Markup Language (HTML) data configured to be inserted into the first data file for a display of the one or more electronic information cards on a web page or a web-based application; and Cascading Style Sheets (CSS) data configured to be inserted into a second data file for a display of the one or more electronic information cards on a web page or a web-based application.

13. The computer-implemented method of claim 1, wherein the received electronic information card rendering data is stored in a cache or an external storage.

14. The computer-implemented method of claim 1, wherein the trigger event is a hover-over event or a click event associated with the term.

15. The computer-implemented method of claim 1, further comprising:

modifying, by way of the SDK, the display based on the first data file to visually distinguish the one or more terms.

16. The computer-implemented method of claim 1, wherein the modifying of the display to display the electronic information card is performed without use of a browser extension.

17. A system for integrating electronic information card display at a client via a software development kit (SDK), comprising:

one or more processors; and one or more computer-readable media comprising instructions that, when executed by the one or more processors, cause the one or more processors to perform operations for integrating electronic information card display at a client via a software development kit (SDK) provided at one or more data servers, the operations comprising:

requesting, by the client, the SDK from the one or more data servers based on a code snippet in a first data file;

receiving, by the client, the SDK from the one or more data servers;

requesting, by way of the SDK at the client, a plurality of keywords specific to an organization of a current user of the client and associated with a plurality of electronic information cards from the one or more data servers;

receiving, by the client, the plurality of keywords specific to the organization of the current user of the client from the one or more data servers;

determining, by way of the SDK, one or more terms in the first data file that match one or more keywords of the plurality of keywords;

determining, by way of the SDK, one or more electronic information cards of the plurality of electronic information cards that correspond to the one or more keywords specific to the organization of the current user of the client;

requesting, by way of the SDK, electronic information card rendering data associated with the one or more electronic information cards from the one or more data servers specific to the organization of the current user of the client;

receiving, by the client, the electronic information card rendering data associated with the one or more electronic information cards from the one or more data servers;

determining, by way of the SDK, whether a trigger event associated with a term of the one or more terms has occurred; and upon detecting the trigger event, modifying, by way of the SDK, a display based on the first data file to display an electronic information card that corresponds to a keyword of the one or more keywords matching the term, based on at least a portion of the electronic information card rendering data.

18. The system of claim 17, wherein the one or more data servers comprise a library server, and wherein the code snippet is a JavaScript code configured to load the SDK from the library server.

19. The system of claim 17, wherein the first data file is a Hypertext Markup Language (HTML) file.

20. One or more non-transitory computer-readable media storing instructions that, when executed by one or more processors, cause the one or more processors to perform operations for integrating electronic information card display at a client via a software development kit (SDK) provided at one or more data servers, the operations comprising:

requesting, by the client, the SDK from the one or more data servers based on a code snippet in a first data file;

receiving, by the client, the SDK from the one or more data servers;

requesting, by way of the SDK at the client, a plurality of keywords specific to an organization of a current user of the client and associated with a plurality of electronic information cards from the one or more data servers;

receiving, by the client, the plurality of keywords specific to the organization of the current user of the client from the one or more data servers;

determining, by way of the SDK, one or more terms in the first data file that match one or more keywords of the plurality of keywords specific to the organization of the current user of the client;

determining, by way of the SDK, one or more electronic information cards of the plurality of electronic information cards that correspond to the one or more keywords specific to the organization of the current user of the client;

requesting, by way of the SDK, electronic information card rendering data associated with the one or more electronic information cards from the one or more data servers;

receiving, by the client, the electronic information card rendering data associated with the one or more electronic information cards from the one or more data servers;

determining, by way of the SDK, whether a trigger event associated with a term of the one or more terms has occurred; and upon detecting the trigger event, modifying, by way of the SDK, a display based on the first data file to display an electronic information card that corresponds to a keyword of the one or more keywords matching the term, based on at least a portion of the electronic information card rendering data.

* * * * *